US007062541B1

(12) United States Patent
Cannon et al.

(10) Patent No.: US 7,062,541 B1
(45) Date of Patent: Jun. 13, 2006

(54) SYSTEM AND METHOD FOR TRANSFERRING RELATED DATA OBJECTS IN A DISTRIBUTED DATA STORAGE ENVIRONMENT

(75) Inventors: David M. Cannon, Tucson, AZ (US); Colin S. Dawson, Tucson, AZ (US); Mark A. Haye, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/563,547

(22) Filed: Apr. 27, 2000

(51) Int. Cl.
*G06F 15/16* (2006.01)

(52) U.S. Cl. .................... 709/219; 709/217

(58) Field of Classification Search ............... 709/200, 709/201, 202, 203, 217, 219, 204; 707/204, 707/4
See application file for complete search history.

(56) References Cited

U.S. PATENT DOCUMENTS

| | | | | |
|---|---|---|---|---|
| 5,321,832 A | | 6/1994 | Tanaka et al. ............ 395/600 |
| 5,396,490 A | * | 3/1995 | White et al. .............. 370/474 |
| 5,555,375 A | * | 9/1996 | Sudama et al. ........... 709/226 |
| 5,588,148 A | | 12/1996 | Landis et al. ............. 395/601 |
| 5,649,196 A | * | 7/1997 | Woodhill et al. ......... 707/204 |
| 5,706,507 A | | 1/1998 | Schloss ..................... 395/615 |
| 5,742,759 A | * | 4/1998 | Nessett et al. ............ 713/201 |
| 5,751,997 A | * | 5/1998 | Kullick et al. ............ 711/162 |
| 5,754,782 A | * | 5/1998 | Masada .................... 707/204 |
| 5,872,777 A | * | 2/1999 | Brailean et al. .......... 370/349 |
| 5,974,563 A | * | 10/1999 | Beeler, Jr. .................... 714/5 |
| 6,003,083 A | | 12/1999 | Davies et al. ............. 709/226 |
| 6,006,234 A | * | 12/1999 | Govindarajan et al. . 707/103 R |
| 6,014,700 A | | 1/2000 | Bainbridge et al. ....... 709/226 |
| 6,018,772 A | * | 1/2000 | Kamalski .................. 709/236 |
| 6,023,710 A | * | 2/2000 | Steiner et al. ............. 707/204 |
| 6,076,148 A | * | 6/2000 | Kedem ...................... 711/162 |

(Continued)

FOREIGN PATENT DOCUMENTS

EP     0 399 560     5/1990

(Continued)

OTHER PUBLICATIONS

Baker et al., "Non-Volatile Memory for Fast, Reliable File Systems", 1992, Proc. of the 5th International Conference on Architectural Support for Programming Languages and Operating Systems, Boston, MA, Oct. 1992, pp. 10-22.*

(Continued)

*Primary Examiner*—Krisna Lim
*Assistant Examiner*—Aaron Strange
(74) *Attorney, Agent, or Firm*—Kunzler & Associates (57) ABSTRACT

A system and method for transferring related data objects in a distributed data storage environment allows for data objects belonging to a common group to be transferred while preserving the grouping of the data objects. The data objects can be transferred in an order in which the data objects are stored, rather than in an order of grouping. The data objects are accompanied with attribute information including a unique group identifier when transferred from a source site to a target site. At the target site, the attribute information for each data object is received and analyzed. An import groups table listing the groups of data objects is used to associate each data object with its group as it is received. Data objects of groups for which any members have not been received are also listed in an unresolved objects table. When a group is complete, all data objects of the group are removed from the unresolved objects table. At the end of a data transfer session, all data objects still listed in the unresolved objects table are deleted.

18 Claims, 6 Drawing Sheets

U.S. PATENT DOCUMENTS

| | | | |
|---|---|---|---|
| 6,397,307 B1 * | 5/2002 | Ohran | 707/204 |
| 6,408,310 B1 * | 6/2002 | Hart | 707/201 |
| 6,415,300 B1 * | 7/2002 | Liu | 707/204 |
| 6,487,644 B1 * | 11/2002 | Huebsch et al. | 711/162 |
| 6,526,418 B1 * | 2/2003 | Midgley et al. | 707/204 |
| 6,539,461 B1 * | 3/2003 | Suzuki et al. | 711/162 |

FOREIGN PATENT DOCUMENTS

| | | |
|---|---|---|
| EP | 0399560 | 5/1990 |
| EP | 0714066 | 5/1996 |
| EP | 0913966 | 5/1999 |
| JP | 03-251935 | 11/1991 |
| JP | 06060039 | 6/1992 |
| JP | 11-053194 | 2/1999 |

OTHER PUBLICATIONS

Communication from European Patent Office dated Jul. 7, 2004.

* cited by examiner

SYSTEM AND METHOD FOR TRANSFERRING RELATED DATA OBJECTS IN A DISTRIBUTED DATA STORAGE ENVIRONMENT

BACKGROUND OF THE INVENTION

1. The Field of the Invention

The present invention relates to systems and methods for transferring related data objects across a distributed data storage environment. More specifically, the present invention relates to systems and methods for transferring a group of data objects between a source storage site and a target storage site using an identifier unique to the group of data objects and tracking the group of data objects with a listing within the target storage site so that only complete groups are transferred and retained at the target.

2. The Relevant Art

In a data processing system, a backup/restore subsystem, usually referred to as a backup subsystem, is typically used as a means to save a recent copy or version of a file, plus some number of earlier versions of the same file, on some form of backup storage devices such as magnetic disk drives, tapes, or optical storage devices. The backup subsystem is used as a means of protecting against loss of data in a given data processing system. For example, if an on-line version of a file is destroyed or corrupted because of power failure, hardware or software error, user error, or some other type of problem, the latest version of that file which is stored in a backup subsystem can be restored and therefore the risk of loss of data is minimized. Another important use of backup subsystems is that even if failures do not occur, but files or data are deleted or changed (either accidentally or intentionally), those files or data can be restored to their earlier state thus minimizing the loss of data.

A closely related concept to the backup subsystem is an archive/retrieve system, usually referred to as an archive subsystem. Archiving refers to making copies of files on lower cost storage such as tape so that the files can be deleted from more expensive technology such as disk storage. Since disk storage is frequently being updated, an archival copy also helps in preserving the state of a collection of data at a particular point in time. Although the improved method of transferring grouped data objects disclosed in this application is primarily described for a backup system, it will be obvious to the person of ordinary skill in the art of data processing that the systems and methods described herein are also applicable to archive systems or other related data storage and storage management systems.

At the present time, the majority of backup systems run on host systems located in a data processing environment. Typically, a new version (also referred to as changed version) of a file is backed up based on a predetermined schedule such as, at the end of each day, or after each time that a file has been updated and saved.

Figure 1:
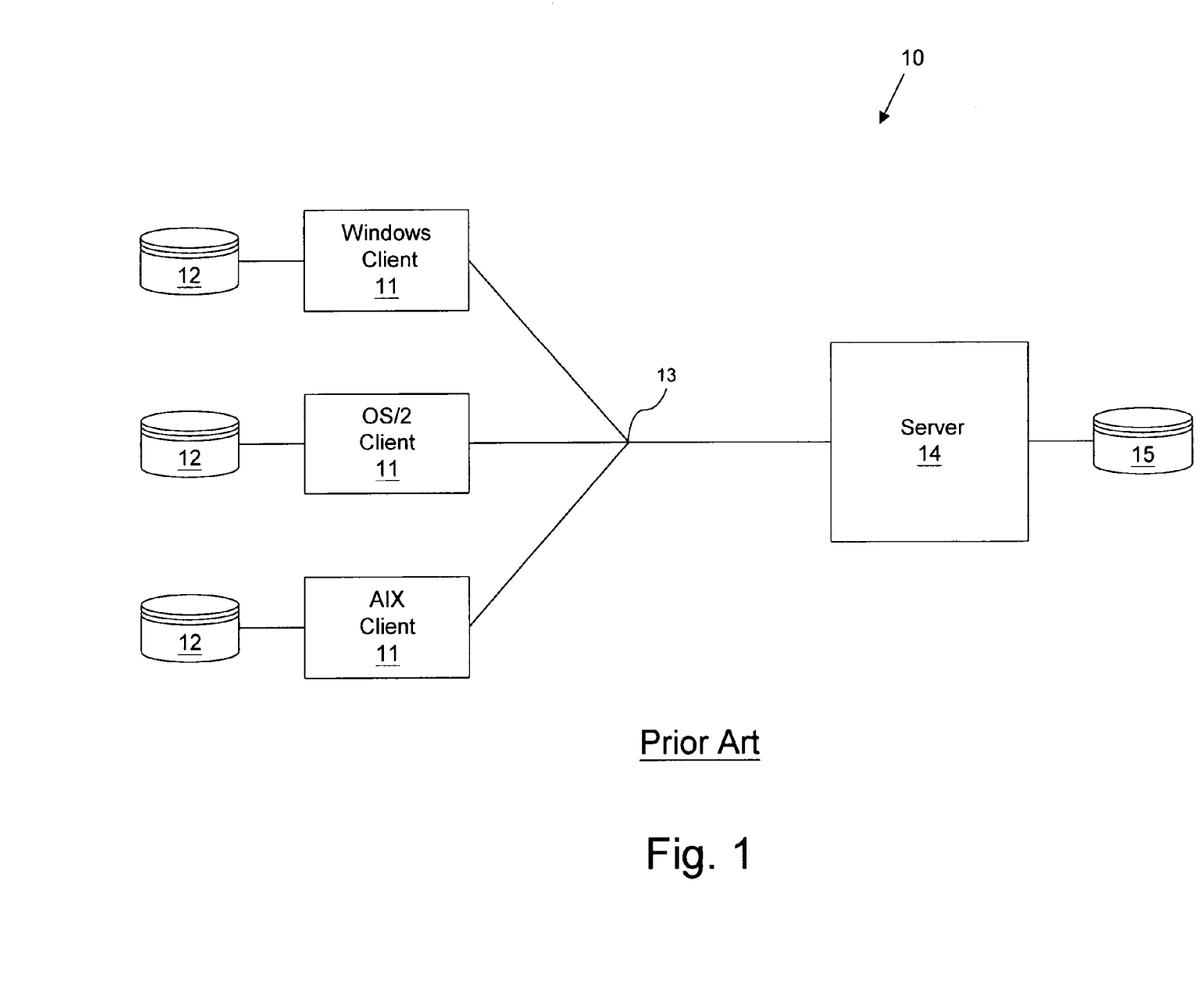
FIG. 1 is a schematic block diagram illustrating one embodiment of a typical distributed client-server system of the prior art.

Recently, the emergence of low cost local area networking, personal computer, and workstation technology has promoted a new type of data processing architecture known as the "client-server" system or environment. A client-server system 10, as shown in FIG. 1, typically consists of a plurality of client computers (also referred to as clients) 11, such as personal computers or workstations. The client computers 11 are preferably provided with a local storage medium 12 such as a disk storage device. The client computers 11 communicate over a network 13, such as an Ethernet or a Token Ring, which links the clients 11 to one or more network server computers 14.

The server computer 14 is generally a mainframe computer, a workstation, or other high end computer and is typically provided with one or more local storage mediums 15 such as a disk storage device, a tape storage device, and/or an optical storage device. The server computer 14 usually contains various programs or data which are shared by or otherwise accessible to the clients 12. Such a client-server system communicating over a network is often referred to as a "distributed" system.

The distributed client-server environment presents a number of major issues related to data processing, integrity, and backup of such data. One major concern in the client-server environment is that a substantial amount of critical data may be located on client subsystems which lack the security, reliability or care of administration that is typically applied to server computers. A further concern is that data may accidentally be lost from a client computer, as users of such computers often do not take the time and care necessary to back up the data on a regular basis. Another concern is that backing up large amounts of data from a client can require large amounts of network bandwidth and server storage space.

Recently a number of client-server backup systems have been developed to alleviate some of the concerns listed above. An example is IBM's Tivoli Storage Manager (TSM), formerly known as ADSM (ADSTAR Distributed Storage Manager). This technology overcomes some of the deficiencies mentioned above by making backup copies of the client data on a backup server. The client copies are made automatically without user involvement and are stored on storage devices which are administered by the backup server.

A typical client-server backup system such as TSM typically operates with a client application operating in the client computer 11 and a server application operating in the server computer 14. The client application, also known as a client backup program, is activated at pre-specified or periodic times and makes contact with the server application, also referred to as a server backup program. After establishing contact and performing authentication, the client application then consults a user-configurable policy which instructs the client application regarding which sort of a backup operation should occur and which files on the client computer will be the subjects of the current backup. It then searches all or a subset of files on the client computer, determining which files should be backed up.

For example, a data file which has changed since the last backup was conducted may be selected for the backup operation. After selecting the files to be backed up, the client application transmits those files across the network to the server application. The server application then makes an entry in a listing such as a backup catalog for each file received and stores those files on a storage device attached to the backup server.

The backup may be conducted as an incremental backup and may utilize differencing. In systems using incremental backup, backups are performed only for those files which have been modified since the previous incremental or full backup. Differencing relies on comparisons between two versions of the same file, where multiple versions are saved as a "base file," together with some number of "sub-files" which represent only the changes to the base file. These small files, also referred to as "delta files" or "difference files," contain only the changed portions, typically bytes or blocks which have changed from the base file. Delta files are generated as a result of comparing the current version of a file with an earlier version of the same file, referred to as the base file. Differencing thus exploits redundancy between file versions, in order to achieve reductions in storage space and network traffic.

The backup system, in order to efficiently manage data storage may store data in storage devices organized in a storage hierarchy. A storage hierarchy provides a number of levels of storage devices with data storage in devices at the top levels being more expensive but having shorter access times. Moving down the hierarchy, data storage becomes less expensive, but the access times are longer. Accordingly, frequently accessed data is stored at the higher levels, while the lower levels are more suitable for long-term data storage. Among the levels of the hierarchy, data is stored in storage pools. A storage pool is a collection of storage volumes with similar geometries. Pools are collections of volumes capable of being used on a particular device. Examples of media stored in pools include tape, optical disks, magnetic disks, and other media having the same format.

The backup system also carries out several other important operations. For instance, backup copies of files that were made previously may be moved from disk storage to tape storage in order to reduce storage costs. Another important function of the client-server backup system occurs when the user requests the restoration of a file. The client application contacts the server application, which consults its backup catalog to establish the location of the backup copy of the file. The server then returns that file across the network to the client computer which in turn makes it available to the user.

Examples of hardware which may be employed in a backup system in a distributed client-server environment include one or more server computers such as mainframes, workstations, and other high end computers and storage mediums such as the IBM 3390 magnetic storage system, IBM 3494 tape storage library or IBM 3595 optical library. Optical and tape storage libraries typically provide automated mechanical mounting and demounting of tape or optical cartridges into read/write drives. When several such devices are present, the server application is often configured to utilize the devices in a storage hierarchy in which the most likely to be accessed backup files are kept on faster access devices such as local non-volatile memory, and files less likely to be accessed are kept on less expensive, but slower access devices, such as tape or optical disks.

One challenge in such distributed backup systems is that a backup server may become outdated or of insufficient capacity. For this and other reasons, it may become necessary to transfer the files and other data objects stored on the server to another server. This transfer of data objects presents challenges due to the nature of the storage hierarchy on which the data objects are stored. Data objects may be distributed across many different volumes and different media types of the storage hierarchy. Data transfer is further complicated by the fact that some of the data objects may be related in a group, yet may not be contiguously stored on the storage media. For instance, in differencing backup systems, groups of files comprising a base file and the sub-files reflecting modifications to the base file must be available for restoration to a client. Any transfer of these grouped files must track the relationship of these files.

Accordingly, transferring groups of related data objects between distributed backup systems presents a dilemma. Transferring the files in a grouped order would consume an inordinate amount of time, because so doing would require excessive mounting and positioning of storage pool volumes. Yet, transferring the files in the order in which they are stored (which may be based on the order in which they were received) makes it difficult to track the relationship between the files within the groups. Accordingly, a need exists in the art for a system and method capable of efficiently transferring groups of related files in a distributed data storage system while tracking the relationship of the grouped files so that the grouped files can be associated on the target storage site.

OBJECTS AND BRIEF SUMMARY OF THE INVENTION

The data storage management system and method of the present invention have been developed in response to the present state of the art, and in particular, in response to the problems and needs in the art that have not yet been fully solved by currently available storage management systems. Accordingly, it is an overall object of the present invention to provide a data storage management system and method that overcome many or all of the above-discussed shortcomings in the art.

To achieve the foregoing object, and in accordance with the invention as embodied and broadly described herein in the preferred embodiment, an improved system is provided for transferring a group of data objects across a distributed data storage system while maintaining the grouping of the data objects. In one embodiment, the system comprises an identifier assignment module located at the source site and configured to assign a group identifier to a group of data objects at the source site.

An object locator module may also be provided within the source site. In one embodiment, the object locator module is configured to locate data objects of the group of data objects dispersed over separate storage devices of the source site. The group of data objects may be interspersed with other data objects on storage volumes of the source site.

A transmission module is preferably also provided at the source site and may be configured to transfer the data objects to the target site in the order the data objects are accessed in the storage devices. The transmission module is preferably further configured to transfer other data objects not within the group of data objects and to transfer all data objects in the order stored on the storage devices. This may include interspersing the other data objects within the transfer of the data objects of the group. The transfer module preferably transfers the group identifier substantially together with each data object of the group of data objects.

A first listing is preferably provided within the target site and is preferably configured to track information about groups of data objects transferred from the source site to the target site. A second listing may also be provided at the target site and is preferably configured to track which of the data objects are members of groups for which all members of the group have not been received.

A tracking module is preferably provided at the target site and in one embodiment is configured to track the group of data objects at the target site using the group identifier. The tracking module may also be configured to determine whether all data objects of a group of data objects have been transferred during a transfer session. A purge module may be provided and may be configured to delete all transferred data objects from a group of data objects if the transfer session ends without all members of the group having been transferred.

A grouping module is preferably located at the target site. In one embodiment, the grouping module is configured to examine a group identifier transferred with each data object against the group identifier of groups within the listing to determine membership in a group.

A database entry module may be provided within the target site. In one embodiment, the database entry module is configured to make an entry within the listing for each grouped data object. Preferably, the entry indicates attributes of the data object and a group identifier identifying the group to which the data object belongs.

In one embodiment, the source site comprises a backup server computer and the group of data objects comprises a base file and one or more sub-files configured to be combined with the base file in order to restore a source file.

The system of the present invention is also accompanied by a method of the present invention for transmitting a group of related data objects between data storage systems while maintaining the grouping of the related data objects. In one embodiment, the method comprises assigning a group identifier to a group of data objects at a source site; transferring the group of data objects from the source site to a target site, including concurrently transferring the group identifier substantially together with each data object of the group of data objects; and tracking the group of data objects at the target site with the group identifier. The method may also comprise the further steps of entering information about each received data object of the group of data objects within a listing at the target site.

In one embodiment, the manner of tracking the group of data objects at the target site comprises making an entry within the listing for each imported group of data objects. The entry is used to associate other subsequently transferred data objects of the group. The group identifier of the object may be compared against the group identifiers of other data objects entered within the listing. Membership in the group is determined by finding a match between group identifiers.

A further step may comprise determining whether all data objects of a group have been transferred by the end of a transfer session. If any data objects of a group have not been transferred, the objects of the group that have been transferred are deleted from the target site.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention will now be described with reference to the backup system 20 of FIG. 2. While the invention is considered advantageous for use with a distributed system, such as the system 10 of FIG. 1, and particularly advantageous for use in backup systems operating in distributed environments such as the system 20 of FIG. 2, the scope of the present invention is not limited to such systems. Indeed, the present invention is considered useful in any situation where groups of related data objects must be transferred between two different data object repositories in a distributed environment. As used herein, the term "data object" is intended to refer to digital files, directories, database table spaces, and other types of discrete digital data blocks that may be stored on a computer or a digital storage system.

Figure 2:
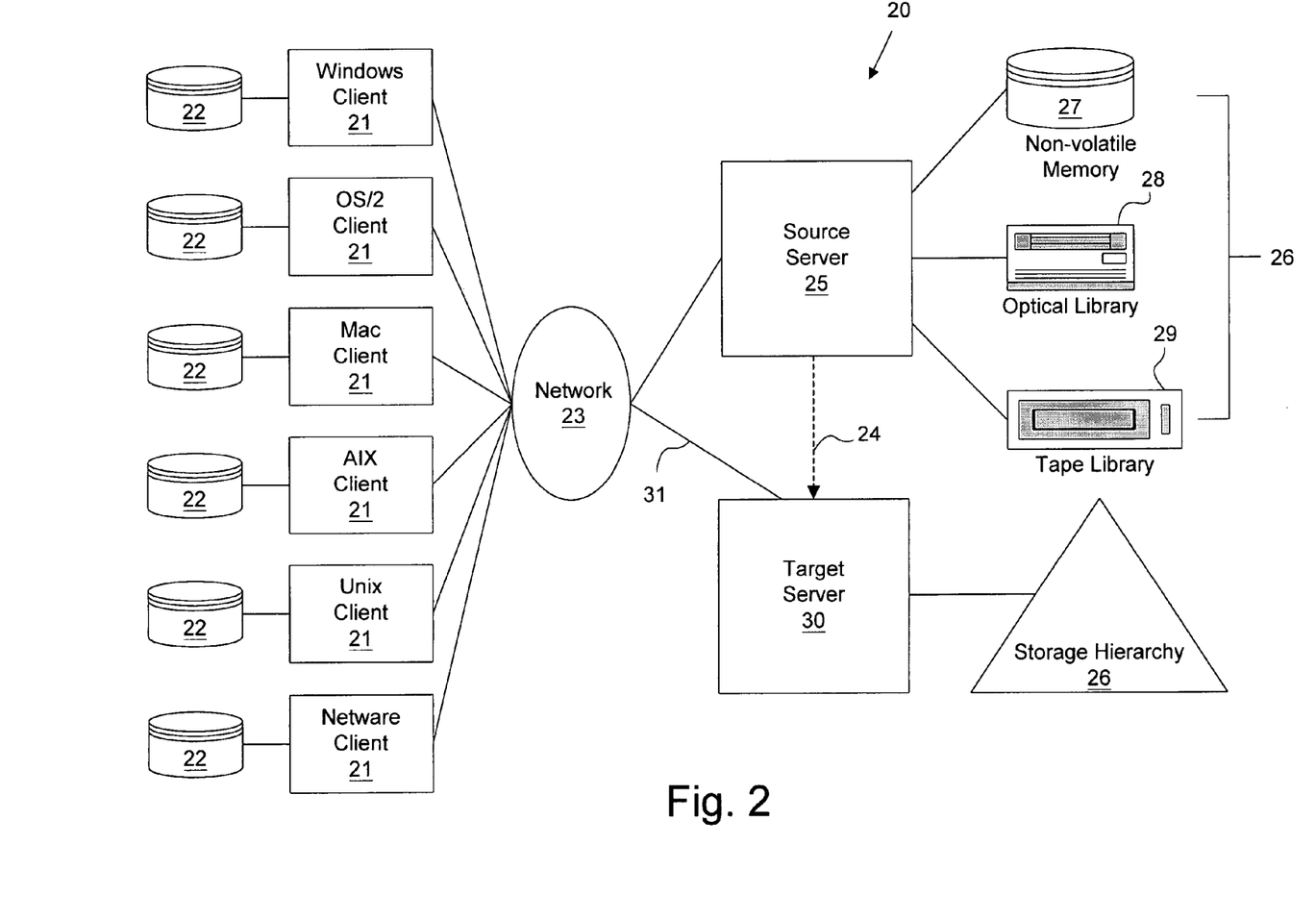
FIG. 2 is a schematic block diagram illustrating one embodiment of a distributed client-server system having a backup system suitable for implementing the present invention.

Referring to FIG. 2, the system 20 is shown including a plurality of client computers 21, each with its own local storage medium 22, such as a disk storage device. The client computers 21 are typically personal computers of the type having a system unit (not shown) which includes a central processing unit (CPU), I/O control, semiconductor and magnetic memories, and an operating system such as a Windows or Macintosh operating system. The client computers 21 may further be workstations of the type having AIX, UNIX, or equivalent operating systems.

The system 20 is shown further including a network 23, such as an Ethernet or Token Ring network, which provides a communication link between the clients 21 and a source backup server 25. The source backup server 25 (referred to herein as a source server or a source site) may be an IBM PC-compatible computer of the type having a system unit (not shown) which includes a central processing unit (CPU), an I/O control, semiconductor and magnetic memories, and an operating system such as the Windows operating system. The source server 25 may also be a workstation having a system unit of the type operating under an AIX, UNIX, or equivalent operating system. Alternatively, the source server 25 may also be a large system operating under an AS/400, VM or MVS operating system. The source server 25 is also shown provided with a storage hierarchy of attached storage mediums 26, such as a disk storage device 27, optical library storage device 28, and/or tape library storage device 29.

In a client-server system 20 such as that shown in FIG. 2, components of the backup system may reside at the source server 25, while other components such as a client-side program (client application) may reside on the client computers 21. Examples of a typical backup system distributed over a client and server include IBM's Tivoli Storage Manager (TSM), the basic operation of which has been briefly described in the background section above. The operation and physical implementation of personal computers, workstations, disk storage devices, optical libraries, tape libraries, and their constituents are well known to those skilled in the art of data processing and require no further description.

Also shown in FIG. 2 is a second digital device or storage site, shown as a target backup server 30. The target backup server 30 (referred to herein as a target server or a target site) may be a second backup server to which data objects of the storage hierarchy 26 of the source server 25 are to be transferred. For instance, the target server 30 may be an upgrade of the source server 25. Alternatively, as a further example, the source server 25 may have become incapable of servicing an increasingly large number of clients 21, and the target server 30 is to be brought on-line to distribute and share the responsibilities of the source server 25. These situations are only examples of the circumstances that exist where data objects might be transferred between a first digital device such as the source server 25 and a second digital device such as the target server 30.

The target server 30 may be in communication with the source server 25 over the network 23, as indicated by the connection 31, but need not be in such communication. Under the present invention, the transfer of data objects, represented by the dashed line 24, may occur by storing object data and corresponding attributes to one or more storage volumes of the source server 25, mounting those storage volumes to storage devices that are connected to the target server 30, and transferring the data and attributes to the target server 30. The storage devices of the target server 30 are represented in FIG. 2 as a storage hierarchy 26, but may comprise any combination of storage devices, as described above for the storage hierarchy 26 of the source server 25.

Figure 3:
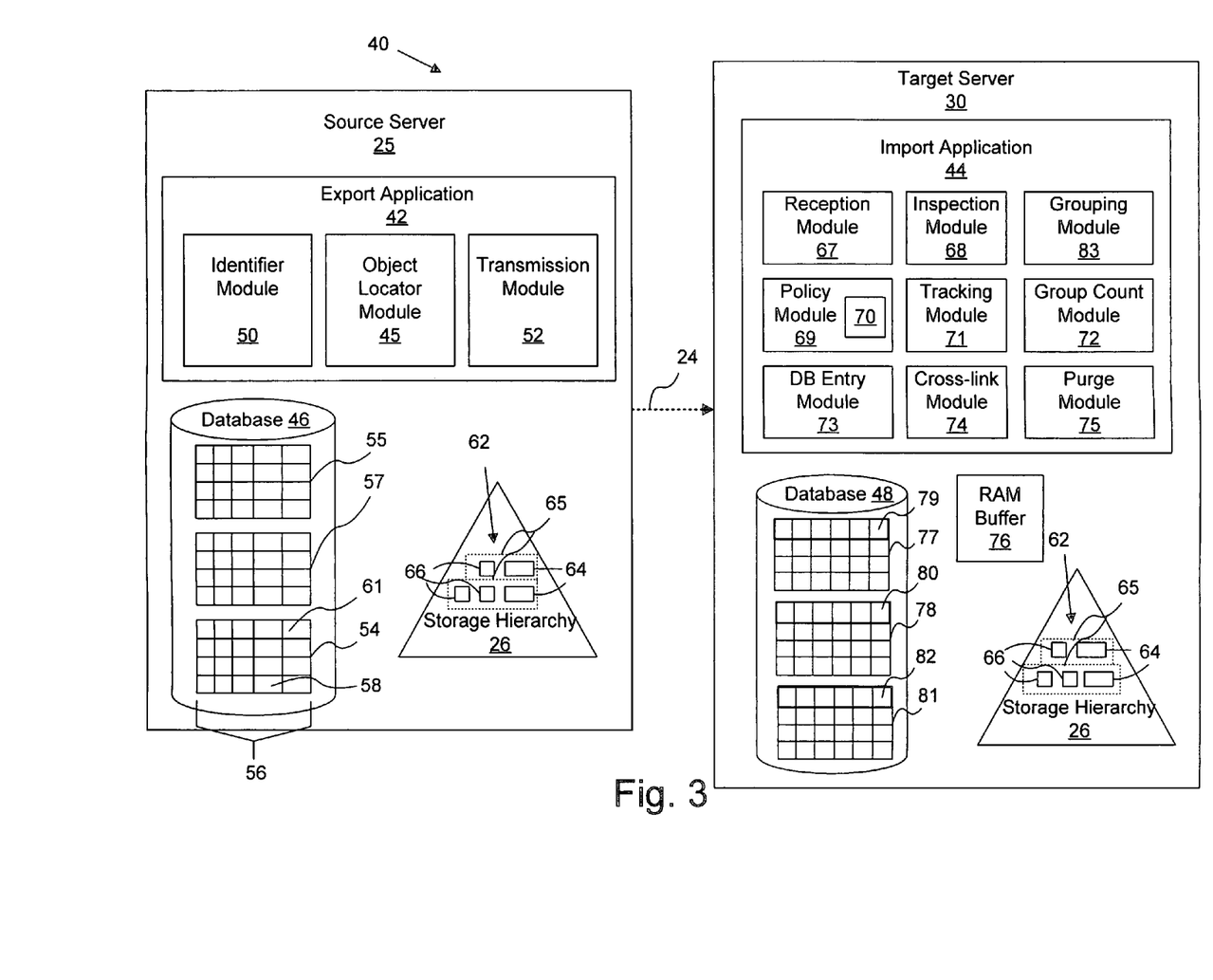
FIG. 3 is a schematic block diagram illustrating one embodiment of a system for transferring groups of related data objects in a distributed environment of the present invention.

FIG. 3 shows one embodiment of a system 40 of the present invention for transferring groups of related data objects between two storage sites. Shown within the system 40 is a first data object storage site in the form of the source server 25 of FIG. 2, and a second data object storage site shown as the target server 30 of FIG. 2. The source server 25 and the target server 30 are shown in an arrangement where related data objects are to be transferred 24 from the source server 25 to the target server 30.

The source server 25 is shown provided with an export application 42, a storage hierarchy 26, and a database 46. Within the export application 42 are shown an identifier assignment module 50, an object locator module 45, and a transmission module 52. Within the database 46 are shown several database listings or tables: an object attributes table 54, an object transfer table 55, and a volume list table 57. The object attributes table 54 lists information about data objects 62 stored within the hierarchy 26, and in one embodiment contains a plurality of attribute fields 56. The attribute fields may list metadata such as a name of a data object 62 within the storage hierarchy 26, an owner of the data object 62, a date of the data object 62, and the like. Stored within the object attributes table 54 is preferably a field or fields 60 containing a source group identifier 61. The source group identifier 60 preferably uniquely identifies the group 65 to which a data object 62 belongs and may be a unique number, character string, time stamp, or the like. Also stored within the object attributes table 54 is preferably a field or fields 58 containing the address or location of the data object 62 within the storage hierarchy 26.

In the depicted embodiment, the data objects 62 are organized into groups 65. Of course, not all of the data objects 62 need be members of a particular group, but under the present invention, at least some of the data objects 62 are organized into the groups 65. In the depicted embodiment, the source server 25 is a backup server operating under an incremental backup scheme using differencing, as discussed above. In the depicted embodiment, the groups 65 comprise related files, in one embodiment related as a base file 64 and one or more sub-files 66 generated using differencing technology. The sub-files 66 are preferably configured to be combined with the base file 64 of the group to restore a source file of a client computer served by the server 25 to its original state at the time of creation of the sub-file 66.

Other types of groups 65 that may be transferred with the system 40 and method of the present invention include peer groups 65 having a peer relationship. For instance, in a peer group, every member must be present or the entire group is invalid. For example, groups might be files of an ACTIVE-DIRECTORY™ of a program such as Windows 2000™ operating system. The files within the ACTIVEDIRECTORY rely upon each other and are useful only if all files are together. Additionally, to install or otherwise transfer applications consisting of a group of multiple peer files, such as executable files and dll files, all files of the peer group must be installed or otherwise transferred together. Without all files of the peer group, the application does not execute in the intended manner. When backing up or otherwise transferring such groups, the members of the group must be associated at the target server or other storage location.

The operation of the source server 25 will be discussed in greater detail with respect to the method of FIG. 5, but briefly, the identifier module 50 is configured to receive a request for a transfer of data objects 62 to the target server 30, and in response, identify the data objects 62 identified in the request. The object locator module 45 is configured to locate those data objects 62 which may be distributed over different volumes of different pools of storage devices on different logical levels of the storage hierarchy 26. Attribute information including the source group identifier 61 is preferably stored within the source server 25, and in one embodiment is stored within an object attributes table 54.

The transmission module 52 is preferably programmed or otherwise configured to transfer or assist in transferring 24 the requested data objects 62 together with their corresponding attribute information 56 to the target server. For instance, the transmission module 52 may be programmed to transfer the data objects 62 over a network such as the network 23 of FIG. 2. Alternatively, the transmission module 52 may include a connection to a storage medium such as tape or optical device onto which the data objects 62 or part of the data objects 62 are stored. Once stored on the storage medium, the storage medium can then be transported to and mounted on a storage device that is compatible with the storage medium and that is connected with the target server 30 for transfer to the target server 30.

The target server 30 is shown provided with an import application 44, a storage hierarchy 26, a database 48, and a RAM buffer 76. Shown within the import application 44 are a reception module 67, an inspection module 68, a grouping module 83, a policy module 69 having a policy 70, a tracking module 71, a group count module 72, a database entry module 73, a cross-link module 74, and a purge module 75. The database 48 is shown provided with three lists or tables, an import groups table 77 and an unresolved objects table 78, and an object attributes table 81. The storage hierarchy is shown containing data objects 62 arranged in groups 65 of base files 64 and sub-files 66 as discussed for the source server 25.

One manner of operation of the target server 30 in receiving a transfer of grouped data objects 62 will be discussed in detail with respect to the discussion of FIG. 6, but briefly, the reception module 67 is configured to receive the data objects 62 transferred from the source server 25 into the target server 30. In one embodiment, this comprises directing the data objects 62 into the RAM buffer 76. The RAM buffer 76 may be RAM memory of the target server 30.

The inspection module 68 is preferably programmed or otherwise configured to inspect the attribute information 56 transmitted with the data objects 62. The grouping module 83 uses that information to determine membership of each data object 62 within a group 65, by comparing the source group identifier 61 to source group identifiers of groups 65 listed within the import groups table 77. The policy module 69 contains a policy 70 that is configured by default or by user selection and determines when a group 65 is complete or "resolved." For instance, in some instances a group 65 may be complete if the base file 64 is present but one or more sub-files is missing, while in other instances, every file of a group 65 must be present for completeness.

The tracking module 71 is programmed or otherwise configured to track groups 65 of data objects 62. The tracking module 71 preferably determines when a group 65 is complete. In so doing, the tracking module 71 preferably consults the policy module 69 for the particular policy 70 that applies. Assisting the tracking module 71 is a group count module 72 which continually updates a group-members-received-count indicating the number of members of a group 65 that have been received. The database entry module 73 enters new groups and updates current listings for groups 65 within the import groups table 77.

In one embodiment, the database entry module 73 also makes an entry into the unresolved objects table 78 for each data object 62 received which is a member of a group 65 for which any members have not yet been received. The database entry module 73 may also be programmed to remove the entries in the unresolved objects table 78 for all members of a group 65 once that group becomes resolved. The entry for the group 65 in the import groups table 77 is preferably also removed at this time. A group 65 is resolved when the tracking module 71 determines that all members of the group 65 have been received, or when the policy module 69 determines that a sufficient number of members has been received.

The cross-linking module 74 is programmed or otherwise configured to cross-link each member of a group 65, once received. This is preferably done by assigning a target group number. Once cross-linked, the members of the group 65 can be accessed together if need be, such as when a restoration involving a base file 64 and a sub-file 66 is requested by a client. The purge module 75 is programmed or otherwise configured to delete all data objects 62 still listed within the unresolved objects table 78 at the end of a data object transfer session.

Figure 4:
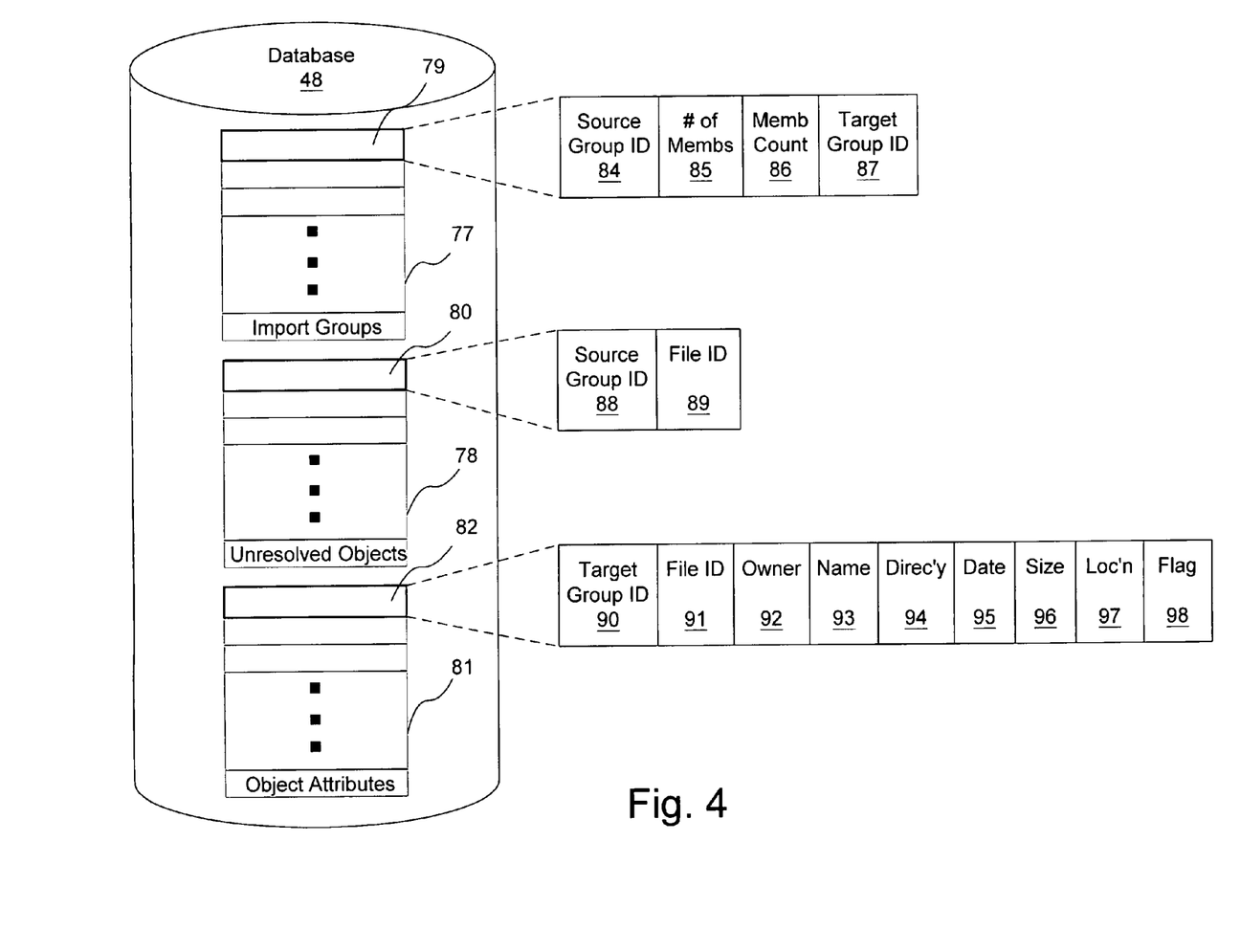
FIG. 4 is a schematic block diagram illustrating one embodiment of listings on a target storage site used under the present invention to associate and track transferred groups of data objects.

FIG. 4 is a schematic block diagram illustrating the contents of the database 48 of the target server 30 under one embodiment of the present invention. The database 48 is shown having therein a first listing, in one embodiment comprising the import groups table 77, and a second listing in one embodiment comprising the unresolved objects table 78. A third listing, comprising an object attributes table 81 is also shown. One entry 79 of the import groups table 77 is shown broken out into its respective fields. The fields include a source group identifier field 84 for receiving the source group identifier 61. The source group identifier 61 is preferably the original source group identifier 61 transmitted with the attributes 56 for each grouped data object 62 and is preferably stored by the database entry module 73 when the data object 62 is received.

A field 85 stores the number of members belonging to the group 65. A field 86 contains the group member count and is used to track the number of data objects 62 of the group 65 that have been received so far. A target group identifier field 87 stores the group identifier assigned by the target server 30. The import groups table is, in one embodiment, a transient table or list. That is, it is created for a new transfer session and may be deleted after the transfer session terminates.

An entry 80 of the unresolved objects table 78 is shown broken out into its respective fields. Fields that may be entered in the unresolved objects table 78 include a source group identification field for receiving the source group identifier 61, and a file identifier field 89 for receiving a file identifier assigned to the data object 62. Preferably, the file identifier is assigned by the cross-link module 74 and is unique across the target server 30. Like the import groups table 77, the unresolved objects table 78 may be transient. Under this embodiment, the unresolved objects table 78 is generated at the beginning of a new transfer session and is deleted after the end of the transfer session.

An entry 82 of the object attributes table 81 is shown broken out into its respective fields. The depicted fields include a target group identifier field 90 for receiving a group identifier for the group 65. The group identifier may be assigned by the cross-link module and is preferably unique across the target server 30 for each group 65. A file identifier field 91 is similar to the file identifier field 89 and stores the file identifier assigned to the data object 62 by the cross-link module 74. An owner field 92 identifies the owner of the data object 62, a name field 93 identifies the name transmitted with the object attributes 56, and a directory 94 may list a directory on a client from which the data object 62 is backed up.

A date field 95 may indicate the date that the data object 62 was created and/or stored, and a size field 96 may indicate the size of the data object 62. A location field 97 may indicate the location, including the pool, volume, and offset where the data object 62 is stored. A flag field 98 may be configured to receive a flag indicating whether the group to which the data object 62 may belong is resolved or not. Of course, these fields are merely illustrative of the fields that may be stored on tables and listings of the target server 30 and of the attributes of the data objects 62 that may be stored in those fields. The object attributes table 81 is preferably a persistent table or list and preferably retains the attribute data previously discussed after the transfer session ends.

Figure 5:
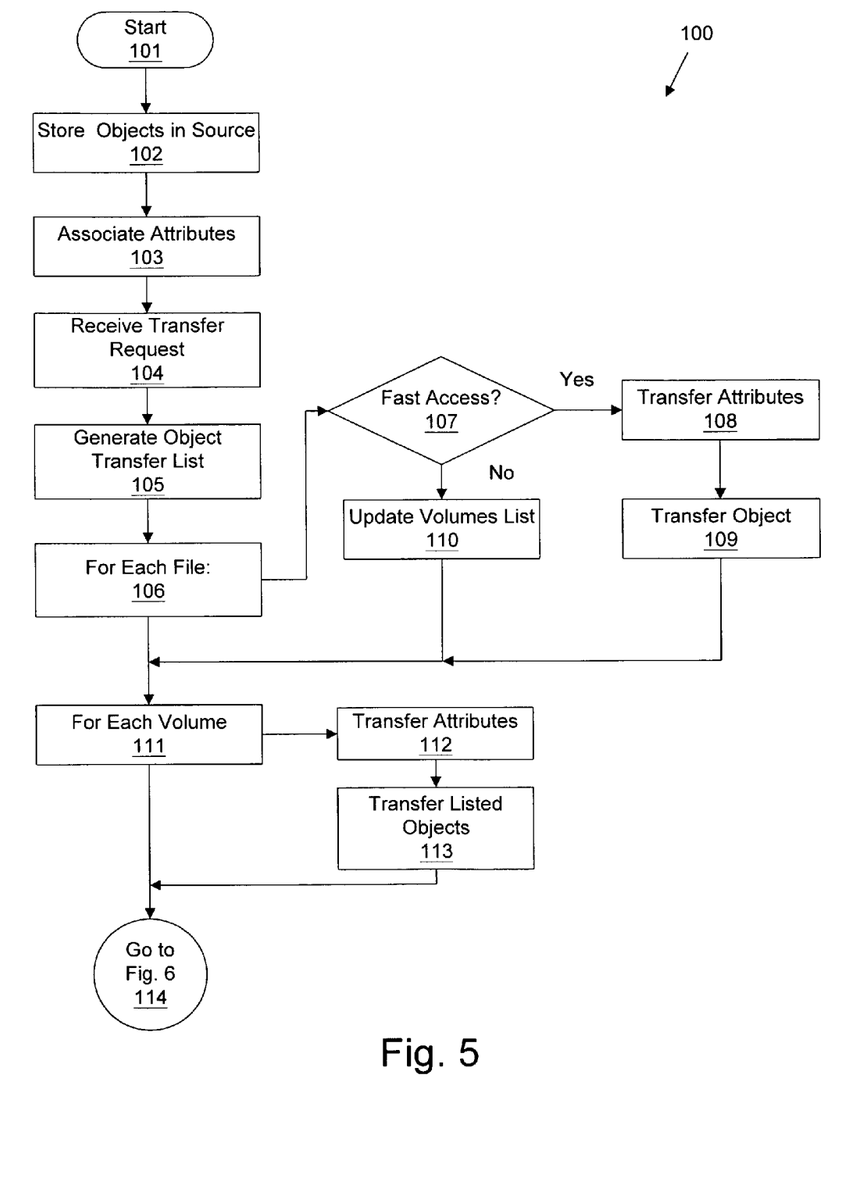
FIG. 5 is a schematic flow chart diagram illustrating one embodiment of a source site portion of a method of the present invention for transferring groups of related data objects in a distributed data management system.

FIG. 5 is a schematic flow chart diagram illustrating one embodiment of a source site portion of a method 100 for transferring related groups of files. The method 100 may be implemented on a system such the system 40 of FIG. 3. The method 100 starts at a step 101 and proceeds to a step 102 in which a plurality of data objects 62 (of FIG. 3) related in groups 65 are stored in the source server 25. In one embodiment, the data objects 62 are stored as part of normal backup procedures within a backup server using an incremental backup system and differencing technology, as discussed above and as well known in the art. Of course, the data objects 62 could also be stored as the result of a previous data object transfer operation of this invention.

At a step 103, attributes (such as the attributes 56 of FIG. 3) of each data object 62 are associated with the data object 62. In one embodiment, the attributes of the data objects 62 are generated and stored in the course of storing the data object 62 as discussed above and as known in the art. In addition, the attributes may be stored in the database 46 of the source server 25 and associated with the data objects 62 during export. Among the attributes is preferably a source group identifier 61 which is associated with each grouped data object 62. In one embodiment, the source group identifier 61 is assigned by the source server 25 to the data object 62 as a cross-linking function prior to storing the data object 62 within the storage devices or storage hierarchy 26 of the source server 25.

At a step 104, a request to transfer data objects 62 is received. Preferably, this request identifies data objects 62 which are members of groups 65 and which must be associated with their groups at the target server 30 as discussed previously. At a step 105 an object transfer list or table 55 is generated. The object transfer list is preferably generated in response to parameters entered by a user who is requesting the transfer. For instance, the user may select the data objects 62 to be transferred from a menu or with a command line using wildcards and the like. The user may specify data objects 62 to be transferred by listing common attributes such as owner, backup date, or the like.

At a step 106, each data object 62 within the object transfer table 55 is examined, preferably by the object locator module 45. As indicated at a decision step 107, the data object is initially examined to determine whether it resides on a storage device that can be quickly accessed. These storage devices include direct access storage devices (DASD) such as hard disk drives and RAM memory such as a RAM buffer. If so, at a step 108, attributes of the data object 62 are transferred. The attributes transferred may be similar to those described in the discussion of FIG. 4 as being stored in the object attributes table 81. In one embodiment, the attributes comprise the attributes 56 stored in an entry for the data object within the object attributes table 54.

At a step 109, the data object 62 is transferred to the target server 30, preferably contiguous with its attributes 56 that were transferred at the step 108. The data objects 62 and attributes 56 may be transferred across a network such as the network 23 of FIG. 2 directly to the target server 30. Alternatively, the transfer may involve copying or moving the data objects 62 to a volume of a storage device connected to the source server 25 which is later mounted on a storage device of the target server 30 and read by the target server 30. Of course, other manners of data transfer may be used.

If the step 107 determines that the data object 62 does not reside on a fast access storage device, residing rather, for instance, on a tape volume, optical disk volume, or other sequential or remote device, the method 100 progresses to a step 110. At the step 110, a volumes list 57 is updated. This preferably comprises updating the volumes list 57 of the source server 25 to list the volume on which the data object 62 is stored. Thus, each volume not considered a fast access volume and on which requested data objects 62 reside will eventually be added to the volumes list 57.

Once every data object 62 of the object transfer table 55 has been examined and processed, the method progresses to a step 111. At the step 111, each volume listed in the volumes list 57 is sequentially mounted and as indicated at a step 112, for every data object 62 of the object transfer table 55 within that volume, the attributes 56 for that data object 62 are transferred. This transfer is preferably conducted as described above, either over a network or with the use of a source volume that is later mounted to a storage device of the target server 30. After the attributes 56 are transferred, the data object is transferred, preferably contiguously with its attributes 56. Thus, each data object 62 of a volume which is to be transferred is transferred in the order in which it is stored. This eliminates the need to mount any volume more than once under the preferred embodiment. Once all of the volumes on the volumes list 57 have been mounted and all data objects 62 on the object transfer table 55 have been transferred, the source server portion of the method 100 concludes and the method progresses, as indicated at 114 to FIG. 6.

Figure 6:
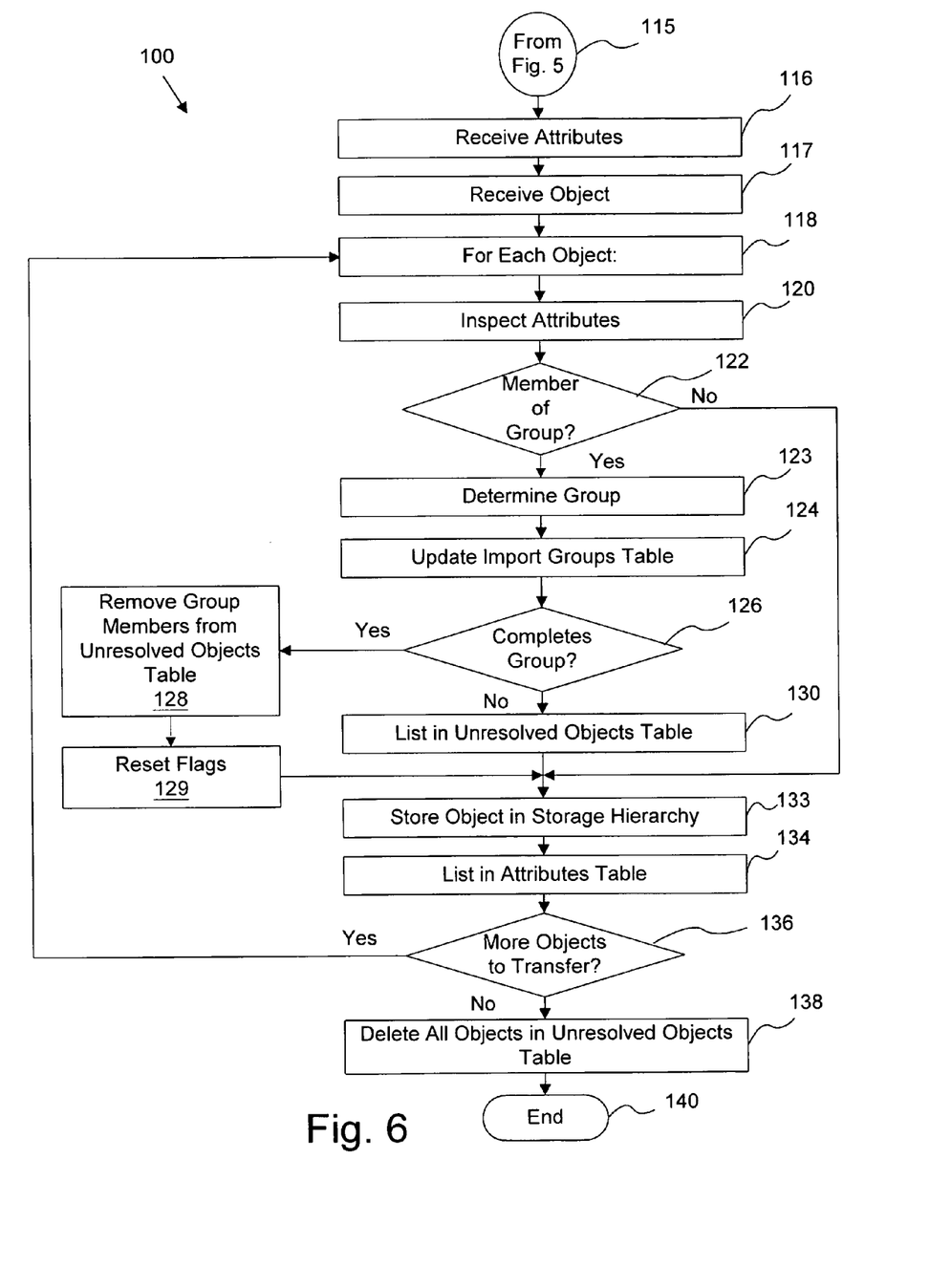
FIG. 6 is a schematic flow chart diagram illustrating one embodiment of a target site portion of a method of the present invention for transmitting groups of related data objects in a distributed data management system.

Referring now to FIG. 6, the target site portion of the method 100 starts at a step 115 and progresses to a step 116. At the step 116, the attributes 56 transferred by the source server 25 at the steps 108 and 112 are received by the target server 30. This preferably comprises receiving a data stream from the network 23 or a mounted volume into the RAM buffer 76.

At a step 117, the data objects 62 are received, preferably substantially together with the receipt of the attributes of step 116. Preferably each data object 62 and its associated attributes and group identifier are transmitted and received in the same transaction, whether a network transaction, tape or disk transfer, or the like. This reception of the data stream of attributes 56 and data objects 62 is preferably a continuous and on-going process, which continues as other steps of the method 100 are carried out.

Thus, at a step 118, the data objects 62 and corresponding attributes and source group identifier 61 are temporarily stored in the RAM buffer 76 and are preferably processed one data object 62 at a time. As indicated by step 120, for each stored data object 62, the associated attributes including the source group identifier 61 are inspected. This may be conducted by the inspection module 68 of FIG. 3. Preferably, it is determined, as indicated at a decision step 122, whether the data object 62 is a member of a group 65. This is preferably conducted by examining an attribute (not depicted) which signifies membership in a group or not.

If the data object 62 is not a member of a group 65, the method progresses to the step 133. If the examined data object 62 is determined to be a member of a group 65, the particular group 65 to which the data object 62 belongs is determined at a step 123. This determination is preferably conducted by the grouping module 83 of FIG. 3, which compares the source group identifier 61 of the data object 62 to the source group identifier within the field 84 of each group 65 entered within the import groups table 77 of FIG. 4. When the source group identifier 61 matches the source group identifier of a group 65 of the import groups table, the data object 62 is determined to belong to that group 65 and can now be associated with that group 65 on the target server 30.

At a step 124, the import groups table 124 is updated. For instance, when no match 11 is found at the step 123, the data object 62 is concluded to be the first received member of a group 65 and a new entry is made in the import groups table 77, using the attributes 56 transmitted with the data object 62. Preferably these include some or all of the attributes 84, 85, 86, and 87 of FIG. 4. Other attributes, such as the number of members in a group 85 may be transferred with other members of the group 65. Additionally, the group count module 72 preferably updates the group count in the field 86 of FIG. 4.

At a step 126, the tracking module 71, together with the group count module 72 determine whether the data object 62 completes a group 65, such that the group 65 is now resolved. Preferably, the policy module 69 is consulted in this determination for the rules about when a group is resolved. For instance, one or more of the data objects 62 of the group 65 is preferably passed with an attribute 85 indicating how many members are in the group 65. For each member received, the group count module 72 updates the count in the group count field. When the group count corresponds to the attribute 85 indicating the number of members in the group 65, the tracking module 71 may determine that the group is resolved.

If the group is complete, at a step 128, all members of the group 65 are removed from the unresolved objects table 78. At a step 129, the flags corresponding to the field 98 in the object attributes table 81 of FIG. 4, are reset for all data objects 62 in the group 65 to indicate that the group 65 is now resolved.

If the group 65 is determined not to be complete at step 126, the method 100 progresses to a step 130. At the step 130, the data object 62 is listed in the unresolved objects table 78. Preferably, entries are made into one or more of the fields 88 and 89 of FIG. 4.

At a step 133, the data object 62 is stored into the storage hierarchy 26. As indicated at the step 134, some or all of the attributes 56 are preferably stored in the object attributes table 81. Preferably, a flag is set in the field 98 if the data object 62 is a member of a group 65 that is as of yet unresolved. The flag preferably prohibits use of received data objects by the target server 30 or its clients until all members of the group 65 are received.

The method 100 then progresses to the decision step 136. If more data objects 62 remain to be transferred, the method goes to the step 118. If no more data objects 62 remain, the method 100 progresses to the step 138. At the step 138, all objects remaining in the unresolved objects table 78 are deleted from the storage hierarchy 26 by the purge module 75. The method 100 ends at a step 140.

With the use of the system and method of the present invention, large numbers of data objects 62 can be transferred 24 between storage sites, even when the data objects 62 are grouped into multiple groups 65. Indeed, those groups 65 may be dispersed and intermingled and stored on different pools, different volumes, and different hierarchy levels. The groups 65 are effectively tracked, and only complete groups 65 are retained on the target server 30 after the transfer session. A message may be sent to the source server or to an operator when groups remain unresolved at the end of the transfer session.

While the system and method of the present invention have been described with respect to one example where the groups of files to be transferred comprise base files and sub-files in a data storage management system, one skilled in the art will readily recognize that the invention has broader application and is also useful for transferring other types of groups of files shared between a first storage site and a second storage site The present invention is considered to cover this broad range of usage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transferring a group of related data objects across a distributed data storage system having a source site and a target site, the method comprising:

assigning a group identifier configured to identify a cross-linked relationship between data objects to a group of data objects at a source site, the data objects of the group of data objects related by a predetermined policy configured to define the required data objects for a complete group of data objects;

locating data objects of the group of data objects dispersed over separate storage devices of the source site;

transferring the group of data objects in the order the data objects are accessed in the storage devices from the source site to a nonvolatile storage device of a target site, including concurrently transferring the group identifier together with each data object of the group of data objects;

tracking the group of data objects at the target site with the group identifier; and determining whether the data objects of the transferred group of data objects comply with the policy.

2. The method of claim 1, further comprising entering information about each group of data objects within a listing at the target site.

3. The method of claim 2, wherein tracking the group of data objects at the target site further comprises determining whether all members of a group have been received by the target site.

4. The method of claim 2, wherein tracking the group of data objects comprises making an entry within the listing for each group of data objects, the entry including the group identifier and comparing a group identifier transmitted with data object to the entries in the listing to determine membership of the data object within a group of data objects.

5. The method of claim 1, further comprising transferring other data objects not within the group of data objects and transferring all data objects in the order stored on the storage devices, including interspersing the other data objects within the transfer of the data objects of the group of data objects.

6. The method of claim 1, wherein the source site comprises a backup server computer and wherein the group of data objects comprises a base file and one or more sub-files configured to be combined with the base file in order to restore a source file.

7. The method of claim 1, wherein the grouped data objects are interspersed with other data objects on storage volumes of the source site.

8. The method of claim 1, further comprising tracking information about groups of data objects transferred from the source site to the target site with a first listing and tracking which of the data objects are members of groups for which any members of the group have not been received with a second listing.

9. The method of claim 1, wherein transferring a group of data objects comprises copying the group of data objects onto a removable storage media at the source site, mounting the removable storage media onto a storage device of the target site and transferring the group of data objects in the order they appear on the removable storage media into a RAM buffer of the target site.

10. The method of claim 1, wherein transferring a group of data objects from a source site to a target site comprises transferring data objects of the group of data objects from separate storage volumes.

11. A system for transferring a group of data objects across a distributed data storage system having a source site and a target site, the system comprising:

an identifier assignment module located at the source site and configured to assign a group identifier configured to identify a cross-linked relationship between data objects to a group of data objects at a source site, the data objects of the group of data objects related by a predetermined policy configured to define the required data objects for a complete group of data objects;

an object locator module within the source site, the object locator module configured to locate data objects of the group of data objects dispersed over separate storage devices of the source site;

a transmission module located at the source site and configured to transfer the group of data objects in the order the data objects are accessed in the storage devices from the source site to a nonvolatile storage device of a target site, including concurrently transferring the group identifier together with each data object of the group of data objects;

a tracking module located at the target site and configured to track the group of data objects at the target site with the group identifier; and a policy module configured to determine whether the data objects of the transferred group of data objects comply with the policy.

12. The system of claim 11, further comprising a listing within the target site, the listing configured to receive information about each group of data objects.

13. The system of claim 12, further comprising a comparison module located at the target site, the comparison module configured to compare the group identifier of one data object of the group of data objects against the information about each group of data objects entered within the listing to determine membership in the group of data objects.

14. The system of claim 12, further comprising a database entry module within the target site, the database entry module configured to make an entry within the listing for each grouped data object, the entry indicating the group to which the data object belongs.

15. The system of claim 11, wherein the transmission module is further configured to transfer other data objects not within the group of data objects and to transfer all data objects in the order stored on the storage devices, including interspersing the other data objects within the transfer of the data objects of the group of data objects.

16. The system of claim 11, wherein the source site comprises a backup server computer and wherein the group of data objects comprises a base file and one or more sub-files configured to be combined with the base file in order to restore a source file.

17. The system of claim 11, wherein the grouped data objects are interspersed with other data objects on storage volumes of the source site.

18. The system of claim 11, further comprising a first listing configured to track information about groups of data objects transferred from the source site to the target site and a second listing configured to track which of the data objects are members of groups for which any members of the group have not been received.

* * * * *